United States Patent [19]

Diwell et al.

[11] Patent Number: 4,996,180

[45] Date of Patent: Feb. 26, 1991

[54] CATALYST OF COPPER OXIDE AND CERIA

[75] Inventors: Alan F. Diwell; Christopher Hallett, both of Reading; Graham P. Ansell, Wokingham; John W. Hayes, Reading, all of United Kingdom

[73] Assignee: Johnson Matthey Public Limited Company, United Kingdom

[21] Appl. No.: 281,406

[22] Filed: Dec. 8, 1988

[30] Foreign Application Priority Data

Dec. 11, 1987 [GB] United Kingdom ............... 8728996

[51] Int. Cl. .................... B01J 23/10; B01J 23/72
[52] U.S. Cl ........................ 502/304; 423/213.2
[58] Field of Search ........................ 502/304

[56] References Cited

U.S. PATENT DOCUMENTS

| 3,226,340 | 1/1965 | Stephens | 252/465 |
| 3,284,370 | 11/1966 | Clifford | 252/462 |
| 3,819,535 | 6/1974 | Huba et al. | 252/462 |
| 3,867,312 | 2/1975 | Stephens | 502/302 |
| 4,181,630 | 1/1980 | Baglin et al. | 252/476 |
| 4,532,324 | 7/1985 | Renken et al. | 544/106 |

FOREIGN PATENT DOCUMENTS

| 0117944 | 9/1984 | European Pat. Off. |
| 58-193736 | 11/1983 | Japan | 502/304 |
| 1594035 | 7/1981 | United Kingdom |

Primary Examiner—W. J. Shine
Attorney, Agent, or Firm—Stevens, Davis, Miller & Mosher

[57] ABSTRACT

Catalysts, particularly for combating air pollution from the exhaust gases of internal combustion engines, consist essentially of an intimate mixture of copper oxide and ceria, the weight of the copper oxide being less than the weight of the ceria.

12 Claims, 10 Drawing Sheets

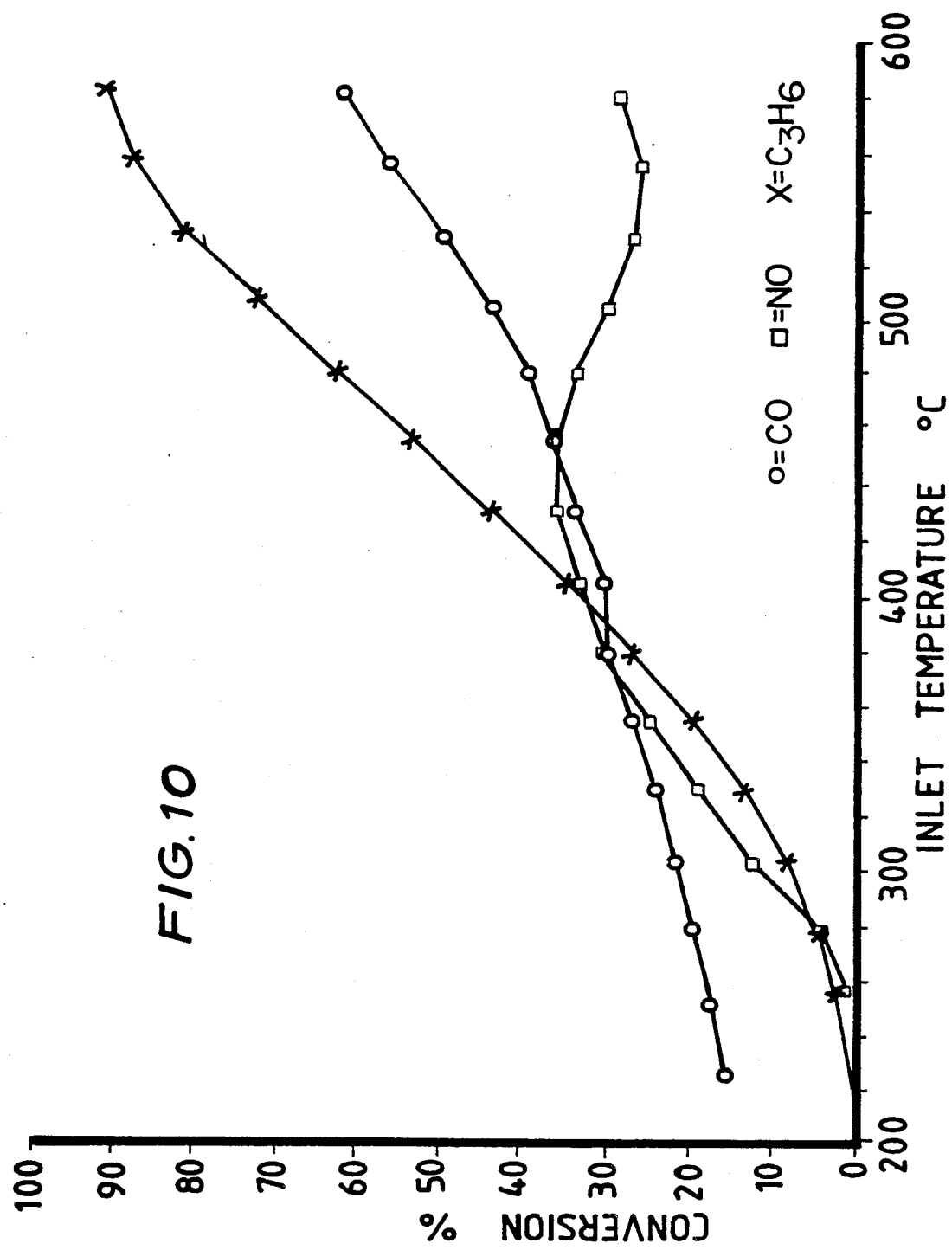

CATALYST OF COPPER OXIDE AND CERIA

This invention relates to new catalysts, their production, their use in catalysing a chemical reaction, and to internal combustion engines whose exhaust apparatus contains them to treat exhaust emissions. The catalysts are suitable for use in oxidation or reduction of chemical feedstocks, low temperature water gas shift, methanol synthesis or in controlling exhaust emissions from internal combustion engines.

United Kingdom Patent No. 1,594,035 discloses a process for preparing a catalytic composition, which comprises depositing an aqueous solution of a precursor of catalytically-active alumina, which solution contains a minor amount of a precursor of a rare earth oxide, on the surface of a macrosize catalyst comprising a catalytically-effective amount of catalytically-active promoting metal component, a high surface area refractory oxide support and a relatively catalytically inactive carrier, the amount of the deposit being sufficient to increase the resistance of the catalyst to poisoning by extraneous materials; and drying the composition subsequent to deposition.

U.S. Pat. No. 3,819,535 discloses that a catalyst for the oxidation of hydrocarbons and carbon monoxide can be obtained by depositing a layer of copper oxide and then a layer of cerium oxide as catalysts on an alumina support which has been stabilized against shrinkage.

U.S. Pat. No. 4,181,630 discloses a method for preparation of a catalyst comprising (a) forming an alloy of copper and a second metal or combination of metals from the group consisting of yttrium, rare earth metals, actinide metals and metals of group IVB of the periodic table; and (b) reacting said alloy in a gaseous atmosphere in order to oxidise the second metal without substantial oxidation of the copper.

European Pat. No. 0,060,740B discloses a catalyst for the treatment of the exhaust gases from internal combustion engines, comprising: a support on which an active phase is deposited which consists of cerium, iron, at least one metal taken from the group comprising platinum and palladium and at least one metal taken from the group comprising iridium and rhodium, characterised in that the active phase also contains at least one metal chosen from gallium and yttrium. The specification states that its catalyst can in addition contain at least one of the following metals: tungsten copper, manganese, tin, germanium, tantalum, uranium and niobium.

U.S. Pat. No. 3,284,370 discloses oxidation catalysts comprising an activated porous metal oxide support or carrier having a mixture of a predominant amount of copper oxide and a minor amount of a rare earth metal oxide or a mixture of rare earth metal oxides on the surface of the activated porous metal oxide.

The present invention provides a catalyst consisting essentially of an intimate mixture of copper oxide and ceria, the weight of the copper oxide being less than the weight of the ceria.

The invention provides also a process for preparing the present catalyst, which process comprises calcining ceria impregnated with a copper compound which on the calcination generates the copper oxide. In one aspect of this process, ceria is impregnated with an aqueous solution of a copper salt decomposable by heat to generate copper oxide, and the impregnated ceria is calcined to generate the copper oxide. In another aspect, ceria is impregnated with an aqueous solution of a copper salt, the impregnated ceria is treated to convert the salt to copper hydroxide or carbonate, and the treated ceria is calcined to decompose the copper hydroxide or carbonate to generate the copper oxide.

The invention provides also a process for preparing the present catalyst, which process comprises precipitating, from an aqueous solution of a copper salt and of a cerium salt, a copper compound and a cerium compound which are decomposable by heat to generate respectively copper oxide and ceria, and calcining the precipitate to generate the copper oxide and ceria.

The invention also provides a process for preparing the present catalyst, which process comprises intimately mixing the copper oxide and ceria.

The invention provides also a method of catalysing a chemical reaction, which method employs as catalyst the present catalyst.

The invention provides also an internal combustion engine whose exhaust apparatus contains a catalyst to convert nitric oxide, carbon monoxide and hydrocarbons in the exhaust emissions of the engine to nitrogen carbon dioxide and water, wherein the catalyst is the present catalyst.

Many ingredients and many combinations of ingredients in many different proportion have been proposed as catalysts. We have discovered, however, that a certain proportion of one particular ingredient in intimate mixture with another particular ingredient is—in direct contrast to the teaching of U.S. Pat. No. 3,284,370 mentioned above —an outstanding catalyst, especially for treating exhaust emissions from internal combustion engines. It is highly effective and long lasting, and avoids such difficult to produce ingredients as platinum and rhodium and such environmentally sensitive ingredients as nickel. When used for treating exhaust emissions form internal combustion engines, the catalyst is also advantageous in controlling the emission of hydrogen sulphide, which can be produced transiently when operating the engine.

In the present catalyst, the copper oxide (preferably cupric oxide or a mixture of cupric and cuprous oxides), by being in intimate admixture with the ceria and in a minor proportion relative to it, is finely dispersed over the ceria to provide a multiplicity of catalytically reactive sites, these sites being formed by interaction between copper and cerium atoms probably by sharing of oxygen atoms. The present structure results in the outstanding properties of the catalyst.

The catalyst can be prepared by forming an intimate mixture of the copper oxide and ceria. This can be done by impregnation of ceria with an aqueous solution of a copper salt from which copper oxide can be generated in a finely divided state dispersed in the ceria by a final calcination of the impregnated ceria, and finally calcining to generate the copper oxide.

The aqueous solution may be impregnated into ceria, which may be partially or wholly hydrated, and if the copper salt is decomposable by heat, the copper oxide may be formed by calcining the impregnated ceria. Alternatively, copper hydroxide or carbonate may be formed by treating the impregnated ceria, e.g. with a precipitate such as ammonia (i.e. aqueous ammonia) or a solution of a carbonate respectively, the so-treated ceria then being calcined to produce copper oxide therein. The ceria may be impregnated "dry" (as exemplified in Example 1 hereafter) or excess copper salt solution may be used. In the latter case, when the precipitant is added, copper hydroxide or carbonate will be precipitated from the excess solution onto the ceria for subsequent heat decomposition.

Alternatively, the ceria may be admixed with a solution of a copper salt which forms a mixed copper-/cerium compound on the surface of the ceria by an ion exchange mechanism, and the impregnated ceria calcined to generate the copper oxide from the copper-/cerium compound (this technique being exemplified in Example 6 hereafter).

As a further alternative, the catalyst may be formed by mixing the aqueous solution of a copper salt with an aqueous solution of a cerium salt, precipitating a decomposable cerium species from the mixed solutions and drying and calcining the precipitate. The decomposable cerium species preferably is hydrated oxide or carbonate precipitated by addition of, for example, ammonia or ammonium or sodium carbonate to the mixed solutions. A decomposable copper species will then also be precipitated as hydroxide or carbonate and will be decomposed to the oxide by the calcining. Not all the copper may be so precipitated but any copper salt left in solution will be impregnated in the cerium species on drying and can form copper oxide on calcining.

Calcining at over 500° C. tends to sinter the ceria and reduce its surface area with consequent reduction in the activity of the catalyst. Typically, the ceria hydrate should not be heated for more than a maximum of two hours at 600° C., although longer times at lower temperatures are possible. The time/temperature conditions should be such that the surface area of the catalyst is not reduced to below 4 m$^2$ g$^{-1}$. Surface areas specified herein are as measured in the conventional way, by the multi-point Brunauer, Emmett and Teller method. Below a surface area of 4 m$^2$ g$^{-1}$ the activity of the catalyst is substantially lowered. Thus, the catalysts of the present invention should have a surface area which is at least 4m$^2$g$^{-1}$. It is preferred to have a catalyst surface area of at least 20 m$^2$ g$^{-1}$.

When ceria is impregnated with a copper salt solution, it is preferred that initially it should have a surface area of at least 20 m$^2$ g$^{-1}$ and preferably at least 50 m$^2$ g$^{-1}$.

In an alternative process, particulate copper oxide and particulate ceria (partially or wholly hydrated), preferably together with particulate inert support material, especially alumina, or particulate copper oxide on the inert support and the particulate ceria, are mixed either dry, or in a liquid under high shear conditions. When mixing dry, particular care needs to be taken to ensure that an intimate mixture of the copper oxide and ceria is formed. In any event, the mixing should be followed by heat treatment to promote a further distribution and interaction of the dispersed copper oxide with the ceria. This heat treatment should be carried out at a temperature of at least 500° C. The presence of the support material tends to stabilise the surface area, so that the effect of calcination at over 500° C. mentioned above is reduced. The heat treatment may be carried out in air or in a hydrothermal atmosphere such as one consisting of 10% H$_2$O, 1% O$_2$ and 89% N$_2$. In the heat treatment, migration of copper or copper oxide onto the surface of the ceria takes place, perhaps involving melting and/or disruptions of crystallites of the copper oxide.

When a simple mixture of copper oxide and ceria is heated at such temperatures, the surface area of the ceria is significantly reduced, with a corresponding reduction in catalytic activity. It is therefore preferred to carry out the co-grinding process on a mixture of particulate copper oxide, ceria and inert support material so that, in subsequent heat treatment, the inert support material serves to maintain the surface area of the ceria component.

The proportion of copper associated as oxide with ceria in the catalyst is preferably in the range 0.1 to 10 weight % (as metal) of the ceria—i.e. with 100 parts by weight of the ceria there is such a weight of copper oxide as contains 0.1 to 10 parts by weight of copper—and preferably in the range 0.5 to 5 weight %. The catalyst may also contain rare earth metal oxide in a proportion of up to 10 weight % (as metal) of the cerium content—i.e. with such a weight of ceria as contains 100 parts by weight of cerium there is such a weight of rare earth metal oxide as contains up to 10 parts by weight of rare earth metal. The rare earth metal oxides are promoters rather that catalytically active themselves. Preferred rare earth metals are lanthanum, praseodymium, neodymium, samarium and gadolinium. Such rare earth metals may be associated with cerium in the salt or the oxide used in preparing the catalyst. Commercial ceria often contains a small amount of rare earth metal oxide, and such ceria can be employed.

The catalyst mixture may be carried on a support, which can be a refractory oxide. The support can be alumina, silica, zirconia, titania or a spinel such as MgAl$_2$O$_4$. The support may be in particulate, e.g. pelleted, form. In preparing a supported catalyst the support may be impregnated with an aqueous solution of a cerium salt from which hydrated ceria or cerium carbonate is deposited dried, calcined and then impregnated with an aqueous solution of a copper salt from which copper oxide may be generated by thermal decomposition of the salt or hydroxide or carbonate precipitated therefrom. Alternatively, a support may be impregnated with the mixed copper/cerium solution, the copper hydroxide and ceria hydrate, or the corresponding carbonates, then being co-precipitated. In each case the calcining stage follows.

A preferred support is alumina since this helps to stabilise the surface area during the calcining stage and in the thermal ageing which may take place during use of the catalyst. Also, it is possible to prepare an alumina supported catalyst by high speed mixing, e.g. in a high shear mixer, of a slurry of preformed copper oxide, ceria and alumina. The ceria used in the slurry should have a surface area of at least 20 m$^2$ g$^{-1}$, preferably at least 50 m$^2$ g$^{-1}$. Gamma-alumina is particularly suitable.

If silica is used as the support it is preferably in the form of spherical particles.

The ratio of ceria to support may be from 10:1 to 1:10 by weight, a ratio of from 1:1 to 1:5 being preferred.

When the catalyst carried on a support is prepared by a process involving simultaneously the generation of the copper oxide, for instance the process described above, allowance should be made for a part of the copper content being associated with the support itself rather that being intimately interacted with the ceria component. The proportion so associated will vary with the overall proportion of copper in the mixture but preferably the overall proportion of copper used in the preparation of a supported catalyst is at least 0.5 weight % of the supported catalyst and, at the higher proportions of support to ceria, can be as high as 25 weight %.

The salt used in the formation of copper oxide, and ceria hydrate when precipitated, may be nitrate acetate, oxalate or sulphate, of which nitrate is preferred. Halides should be avoided because of the possibility of poisoning of the catalyst.

The catalyst can be formulated into a supported catalyst, and used, in conventional ways. The supported catalyst can be used in particulate, e.g. pelleted, form. Preferably, however, the catalyst, and especially the supported catalyst, is carried on a relatively catalytically-inactive, monolithic carrier, preferably in the form of a honeycomb and hence having a plurality of gas flow channels therethrough. The use of such a monolithic carrier is particularly preferred when the catalyst is used for controlling exhaust emissions form internal combustion engines. The monolithic carrier can be of metal but preferably is ceramic.

The catalyst can be employed to catalyse reactions, particularly oxidation or reduction reactions. The reactions include the oxidation of carbonaceous materials, e.g. carbon monoxide or hydrocarbons, or the reduction of nitrogen oxides.

The invention provides a method of producing hydrogen and carbon dioxide by reacting gaseous carbon monoxide and steam in the presence of a catalyst at elevated temperature, usually 200°–600° C., preferably 200°–300° C., in which method there is used as catalyst the present catalyst. Elevated pressure can be employed, for instance up to 3 MPa, preferably a pressure of 1–1.5 MPa.

The invention provides a method of preparing methanol by reacting hydrogen with carbon monoxide and/or carbon dioxide in the presence of a catalyst at elevated temperature, preferably 200°–300° C., and pressure, preferably 5–30 MPa, especially 5–10 MPa, in which method there is used as catalyst the present catalyst.

The catalyst is useful particularly, however, to treat gaseous effluents in order to combat air pollution, especially for so treating the exhaust gases of internal combustion engines, for instance the exhaust gases of petrol (gasoline) driven automobiles. Thus, the invention provides a method of combating the pollution of air by the exhaust emissions from internal combustion engines by contacting the emissions, optionally together with atmospheric oxygen, with a catalyst at elevated temperature, preferably 100–1100° C., especially 200°–850° C., to convert nitric oxide, carbon monoxide and hydrocarbons in the emissions to nitrogen, carbon dioxide and water, in which method there is used as catalyst the present catalyst.

BRIEF DESCRIPTION OF THE DRAWINGS

The invention is illustrated by the following Examples and with reference to the accompanying drawings, in which FIG. 1 shows a schematic arrangement of an apparatus for testing catalytic activity and FIGS. 2 to 10 show the results of such tests.

Figure 1:
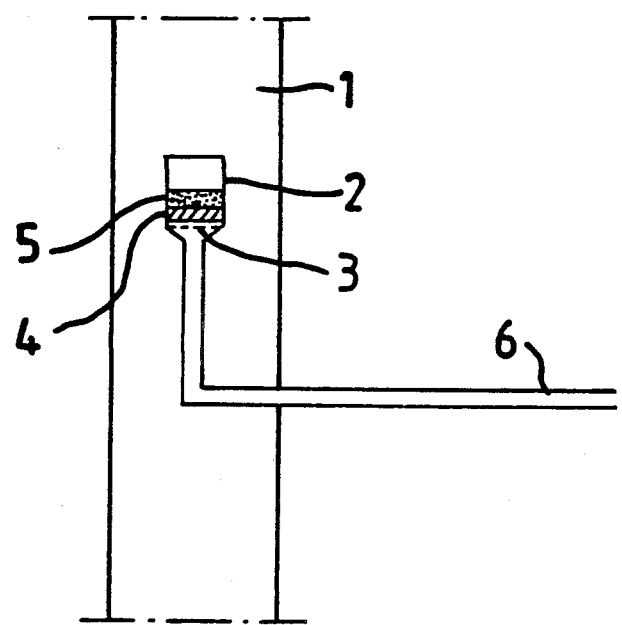

The catalytic activity of copper oxide/ceria mixtures of this invention, and of comparative catalysts, in the conversion of a simulated internal combustion engine exhaust gas was tested in an apparatus as shown in FIG. 1. The apparatus comprises a conduit (1) through which a simulated internal combustion engine exhaust gas can be downwardly passed at various temperature. The flow rate of the exhaust gas can be from 7500 to 8000 liters hour$^{-1}$ through the conduit and its temperature can be varied between 150° and 600° C.

A typical composition of such a simulated exhaust gas is the following in which proportions are by volume:

| | |
|---|---|
| NO | 1500 ppm |
| CO | 1.75% |
| $C_3H_6$ | 100 ppm |
| Other hydrocarbons | 600 ppm |
| $CO_2$ | 15% |
| $H_2$ | 0.33% |
| $O_2$ | 0.75% |
| $H_2O$ | 10% |
| $SO_2$ | 20 ppm |
| $N_2$ (nitrogen) | balance |

The content of oxygen in the above mixture is such that the mixture is "rich", i.e. reducing.

For a "lean", i.e. oxidising, simulated exhaust gas, the CO content is reduced to 0.55% and the $O_2$ content is increased to 1%. In our tests on "lean" and "rich" mixtures the ratio $$\frac{\text{actual air:fuel}}{\text{stoichiometric air:fuel}}$$

is 1.02 and 0.98 respectively. Within the conduit is positioned a sampling funnel (2) containing a disc of stainless steel mesh (3) 4 cm in diameter on which is a layer of quartz wool (4). A layer of catalyst (5) is superimposed on the layer of quartz wool. A sample of heated a gas from the mainstream through the conduit is drawn into the upper open end of the funnel at a rate of 2200 to 2400 ml min$^{-1}$ (space velocity 20,000 hrs$^{-1}$). The sample passes through the catalyst, quartz wool and mesh and into an outlet pipe (6) which is connected outside the conduit to a range of analysers (not shown). In these analysers the content of carbon monoxide, nitric oxide and propylene in the catalysed gas is measured. The percentage conversion of these constituents by the catalyst is calculated and, in FIGS. 2 to 10 is shown plotted against the temperature of the exhaust gas flowing through the conduit. During sampling, the temperature of the exhaust gas is gradually raised from 150° to 600° C. at a rate between 1° and 20° C. min$^{-1}$. In FIGS. 2 to 10 the values for CO are indicated by 0, those for NO by □ and those for $C_3H_6$ by +.

EXAMPLE 1

100 g of hydrated oxides of a cerium containing approximately 2% lanthanum as an impurity, was slurried with 250 ml of an aqueous solution of nitric acid in water (1:4 volume) for 30 minutes to increase the surface area of the hydrated ceria. The slurry was dried overnight and then calcines at 500° C. for 2 hours. To a sample of the calcined ceria, water was slowly added to determine the point of incipient wetness (i.e. the point after which the addition of further water leaves the water unabsorbed and forming a slurry). To the reminder was then added a corresponding volume of water containing copper nitrate in a proportion equivalent to 2.2 wt % copper on ceria. In this way, the copper nitrate was distributed throughout the ceria using the minimum volume of water. The mixture was dried overnight and then calcined at 500° C. for 2 hours, to decompose the nitrate to the oxide. The surface area of the resulting copper oxide-containing ceria was 30 m$^2$ g$^{-1}$.

This catalyst was tested in the apparatus previously described, 10 g being spread on the quartz wool layer in the funnel.

Figure 2:
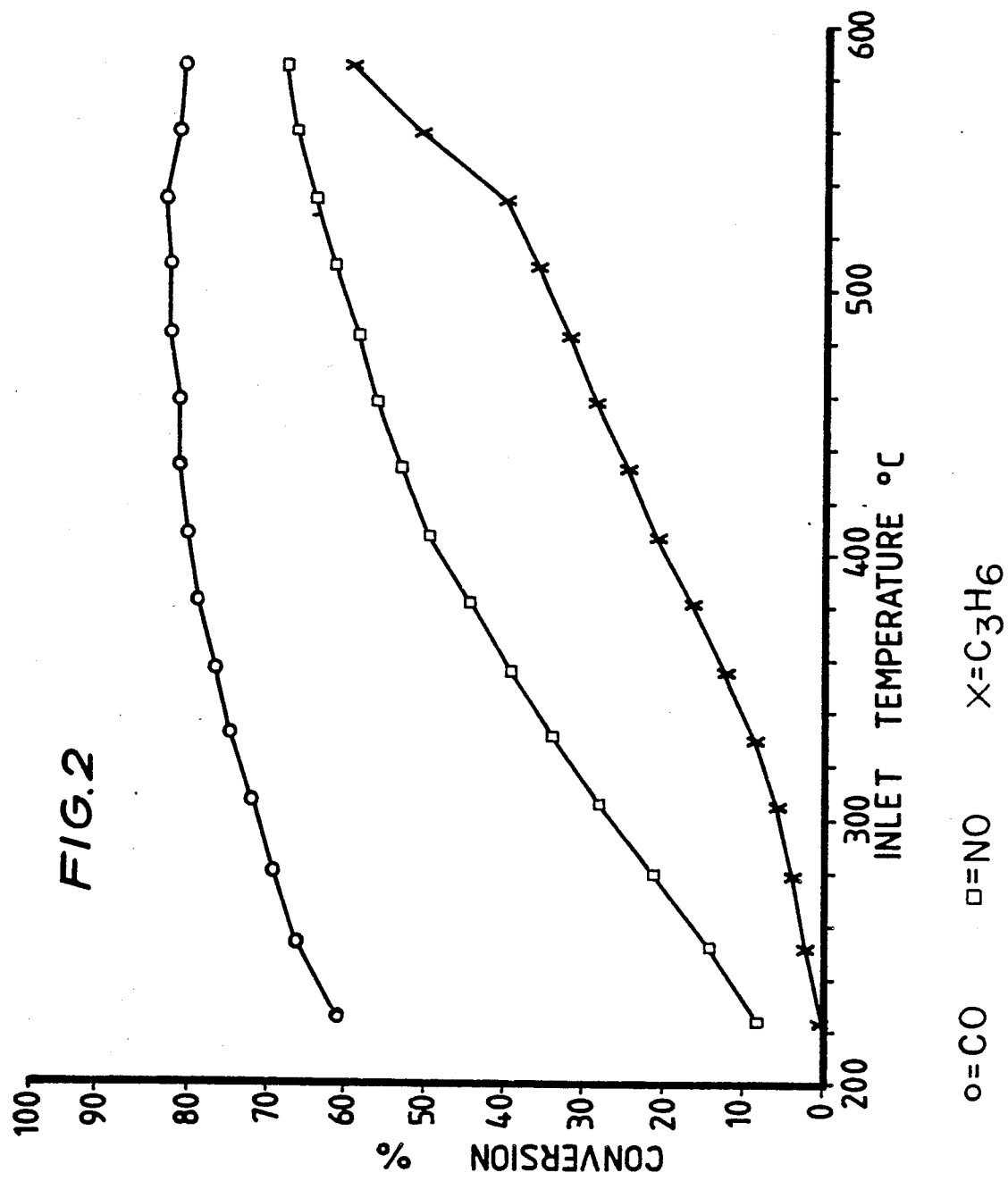

The result of the test is shown in FIG. 2 in which percentage conversions of various exhaust gas components are plotted against the inlet temperature. The light-off value is taken as the temperature at which conversion of a particular component begins. It is preferable if this temperature is below 250° C. for NO and CO. The results shown in FIG. 2 are in respect of a "rich" gas mixture but the trends revealed by the results are equally applicable to a "lean" gas mixture.

COMPARATIVE EXAMPLES 1A AND 1B

Figure 3:
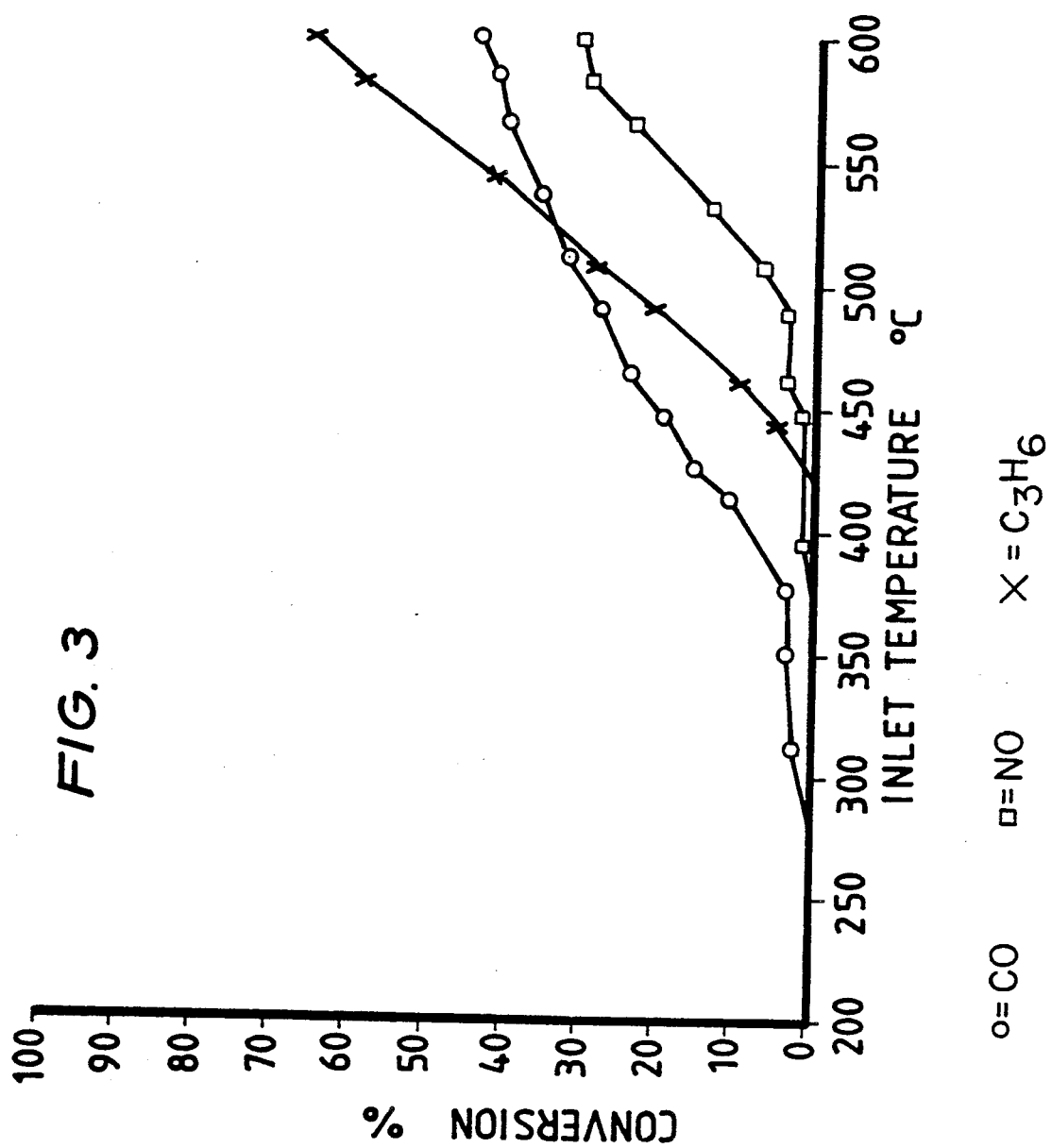
Figure 4:
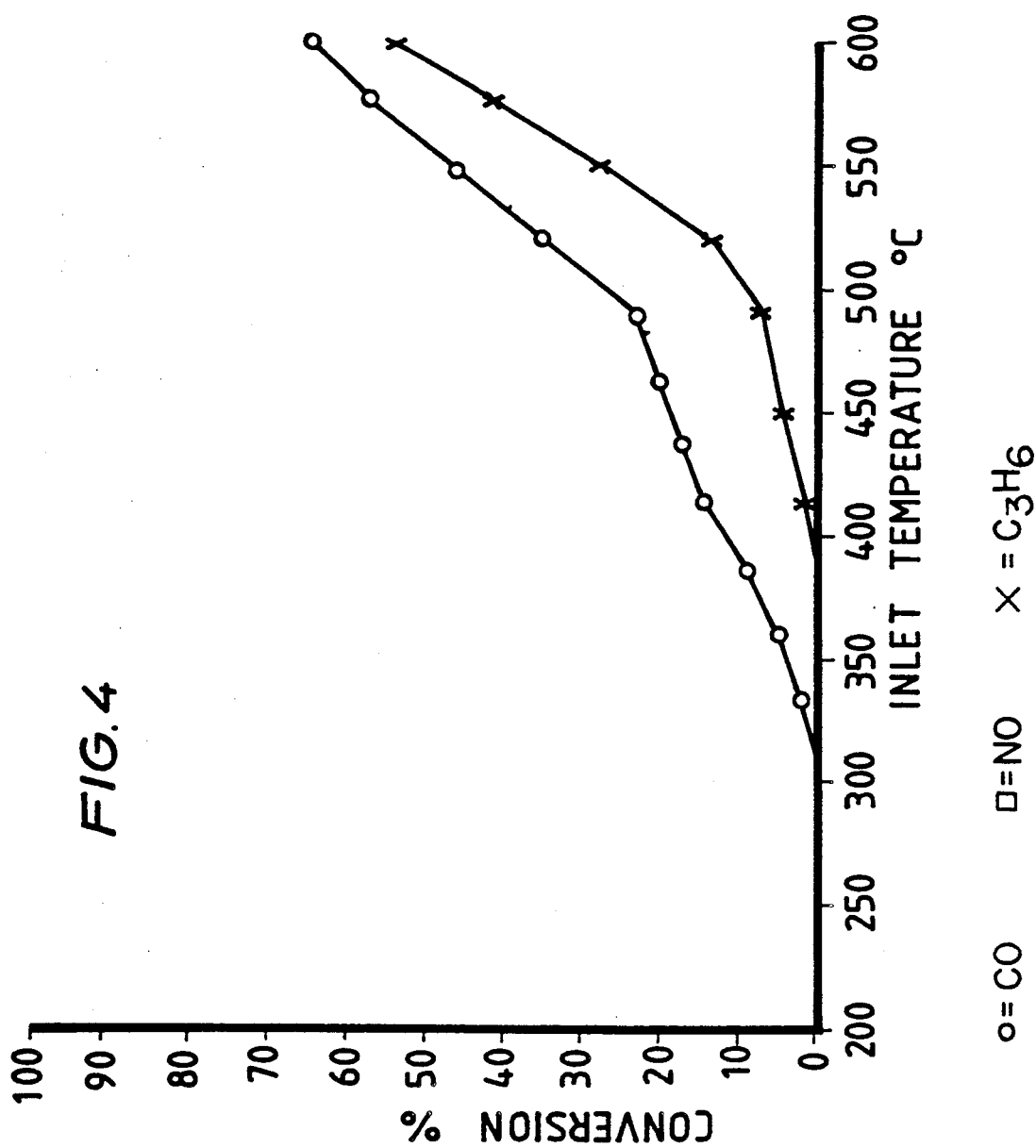

The test of Example 1 was repeated using as catalyst a similar form of ceria without copper oxide and also copper oxide alone, the results being shown in FIGS. 3 and 4 respectively. It can be seen that the percentage conversions of CO, $C_3H_6$ and NO, for the copper oxide-containing ceria catalyst (FIG. 2), are superior to those obtained by using either a similar form of ceria without copper (FIG. 3) or copper oxide alone (FIG. 4). The advantages of the copper oxide-containing ceria catalyst for conversions of exhaust gas pollutants over a wide temperature range are clearly illustrated, especially at lower temperatures. Moreover, the high conversion of CO at relatively low temperatures indicate the usefulness of the catalyst of this invention in processes such as water gas shift and methanol synthesis.

EXAMPLE 2

A supported catalyst was made as follows: 250 of gamma alumina was dispersed, using a high shear mixer in 800 ml water containing therein 630 g of hydrated Ce (III) nitrate. To the stirred mixture was added 240 ml of an 18 molar solution of ammonia in water (3:1 molar proportion of $NH_3$:Ce) to induce precipitation. The mixture was dried and then calcined at 500° C. for 2 hours. The proportion of ceria to alumina in the calcined mixture is 1:1. A copper nitrate solution was then added as described in Example 1 in a proportion of 1.5 wt % copper on total ceria/alumina. The mixture was dried and calcined as before. The surface area of the mixture was 110 $m^2 g^{-1}$.

Figure 5:
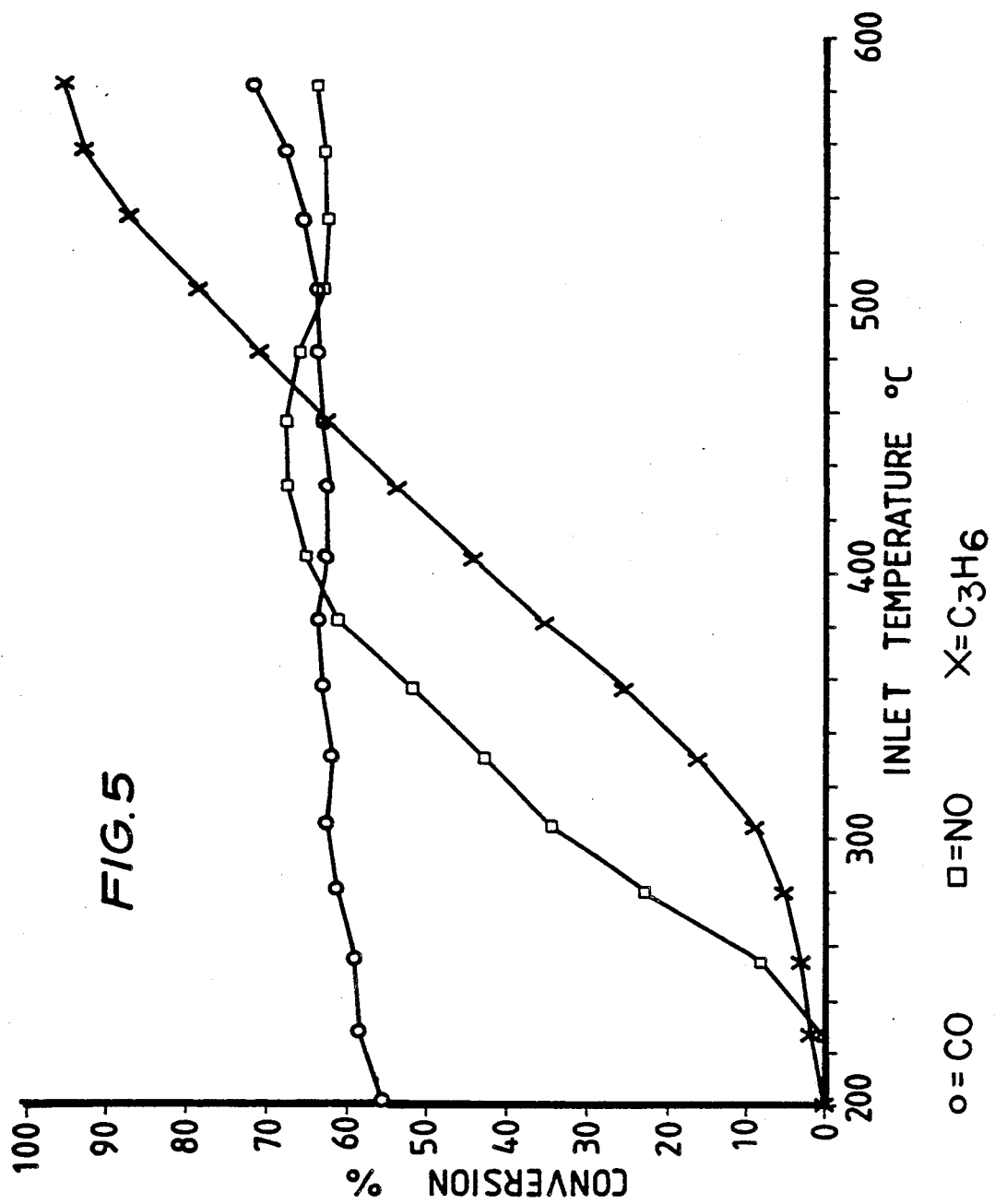

The supported catalyst was tested, using a charge of 6.5 g, in the apparatus described above. The results, using a "rich" mixture are shown in FIG. 5.

EXAMPLE 3

To a solution of 630 g of hydrated cerium (III) nitrate in 800 ml water was added, with vigorous stirring, 240 ml of an 18 molar solution of ammonia in water. The precipitated mixture was dried and calcined at 500° C. for two hours. The ceria so produced had a surface area of 60 $m^2 g^{-1}$. It was impregnated with copper nitrate in a proportion of 1.5 wt % copper on ceria as described above, and then dried and calcined at 500° C. for 2 hours.

Figure 6:
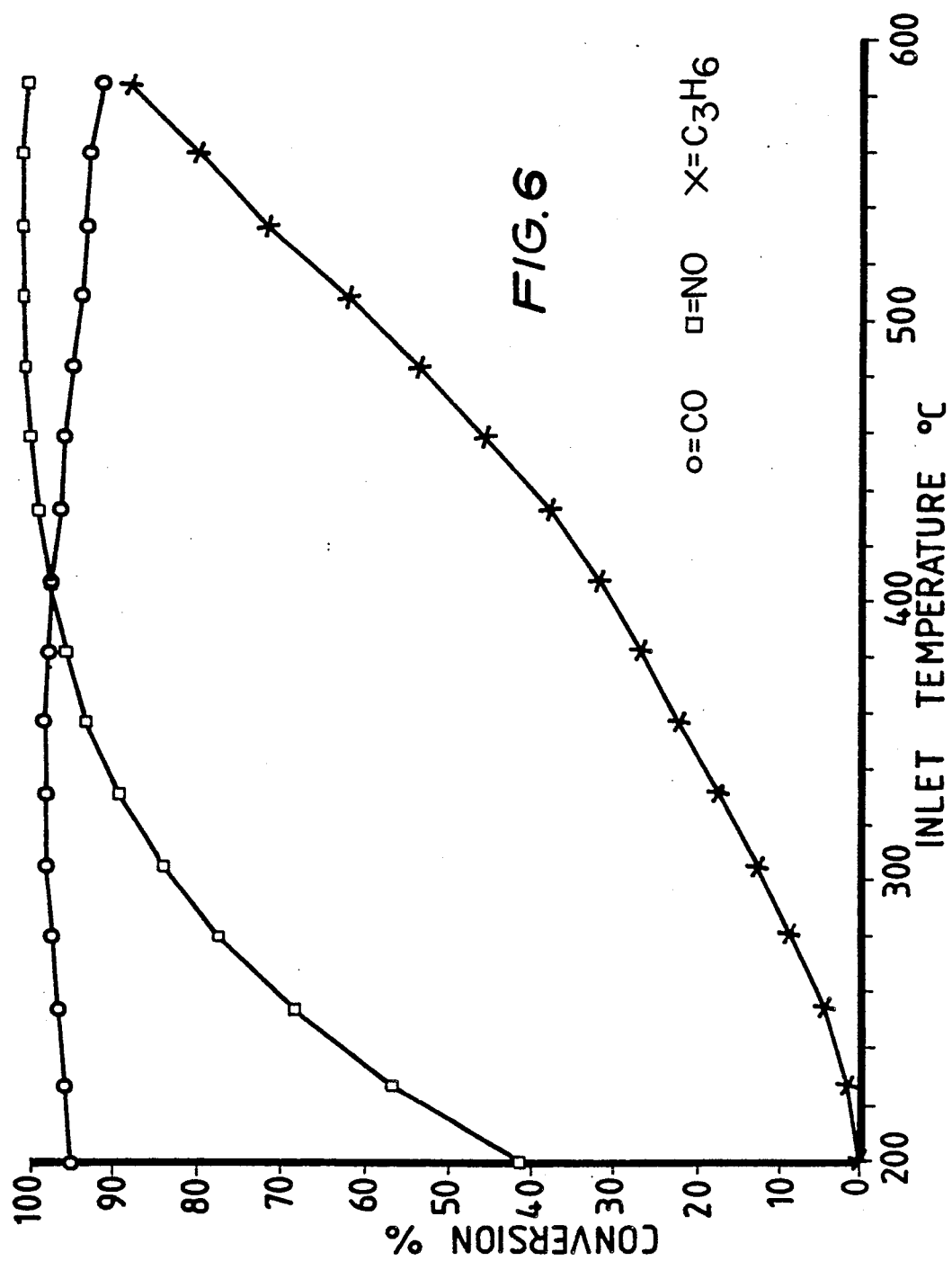
Figure 7:
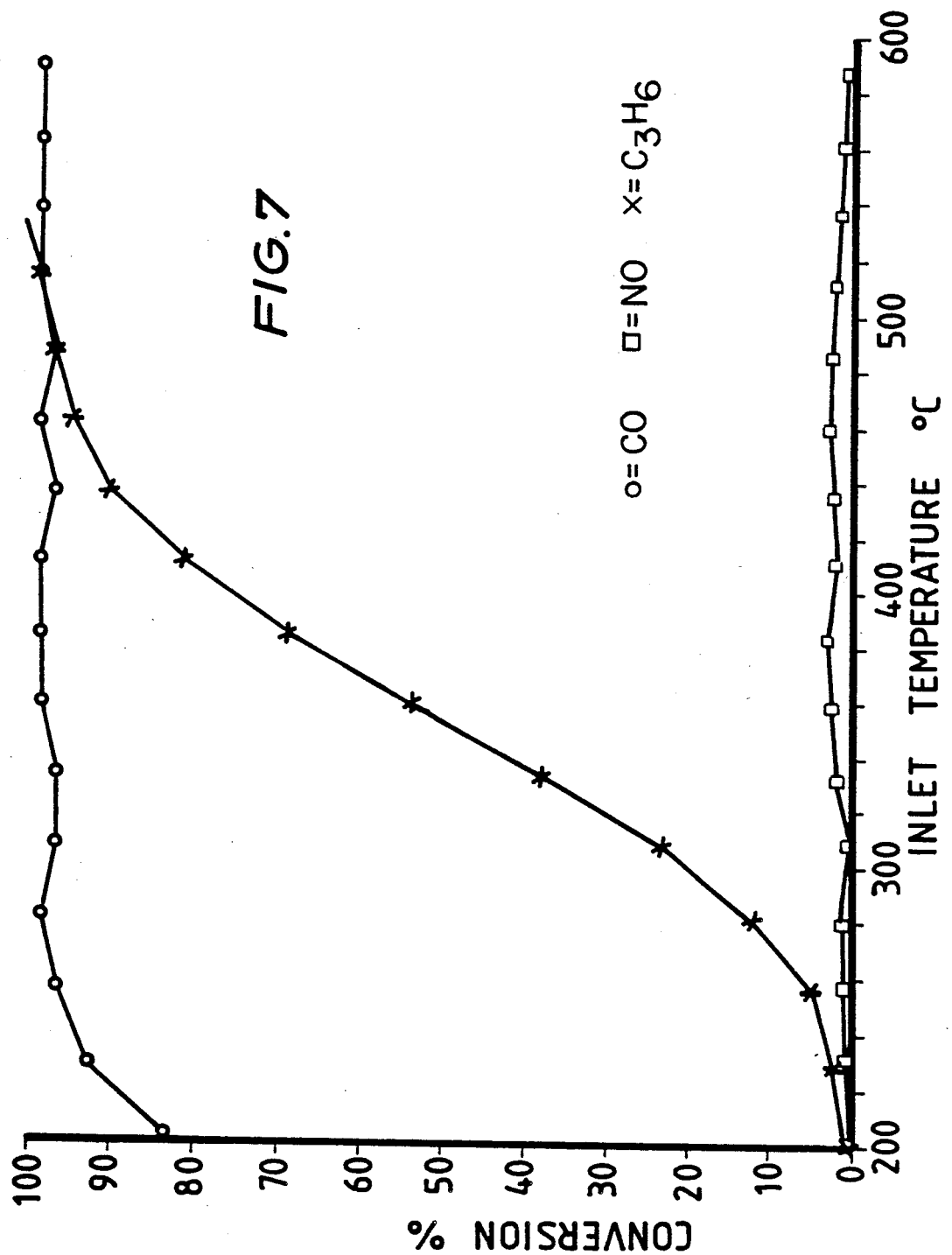

A 10 g sample of the catalyst was tested in the apparatus described above using a "rich" exhaust gas mixture. The results are shown in FIG. 6. It will be noted that higher surface area leads to greater catalytic activity, more active Cu/ceria sites being located on the catalyst surface. Under "lean" exhaust gas conditions, this catalyst exhibits outstanding low temperature oxidation activity for CO and $C_3H_6$ respectively as shown in FIG. 7.

EXAMPLE 4

Ceria hydrate as in Example 1 was heated at 500° C. for 16 hours to reduce its surface area to 4.3 $m^2 g^{-1}$. It was then impregnated with copper nitrate and calcined as described in Example 1.

Figure 8:
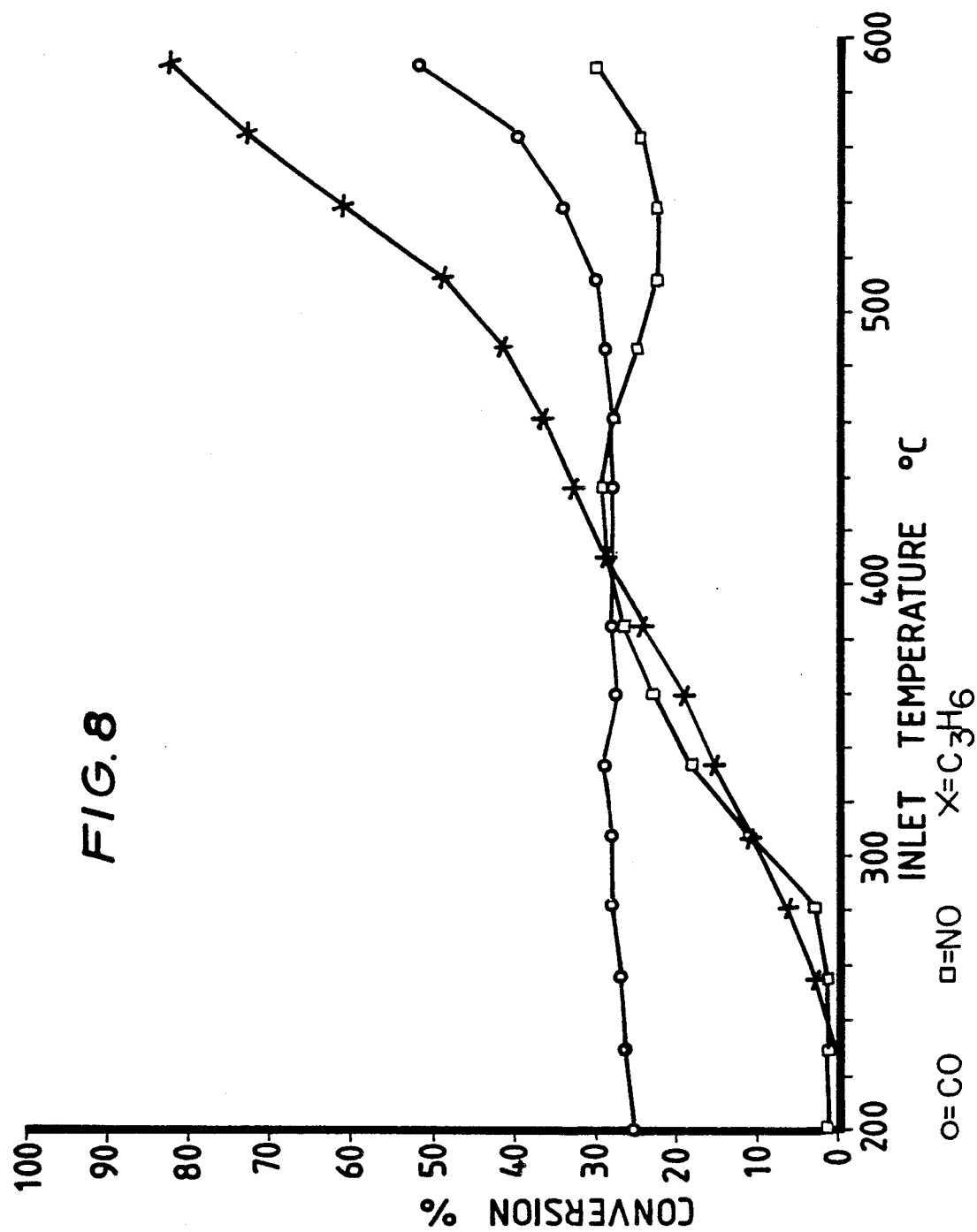
Figure 9:
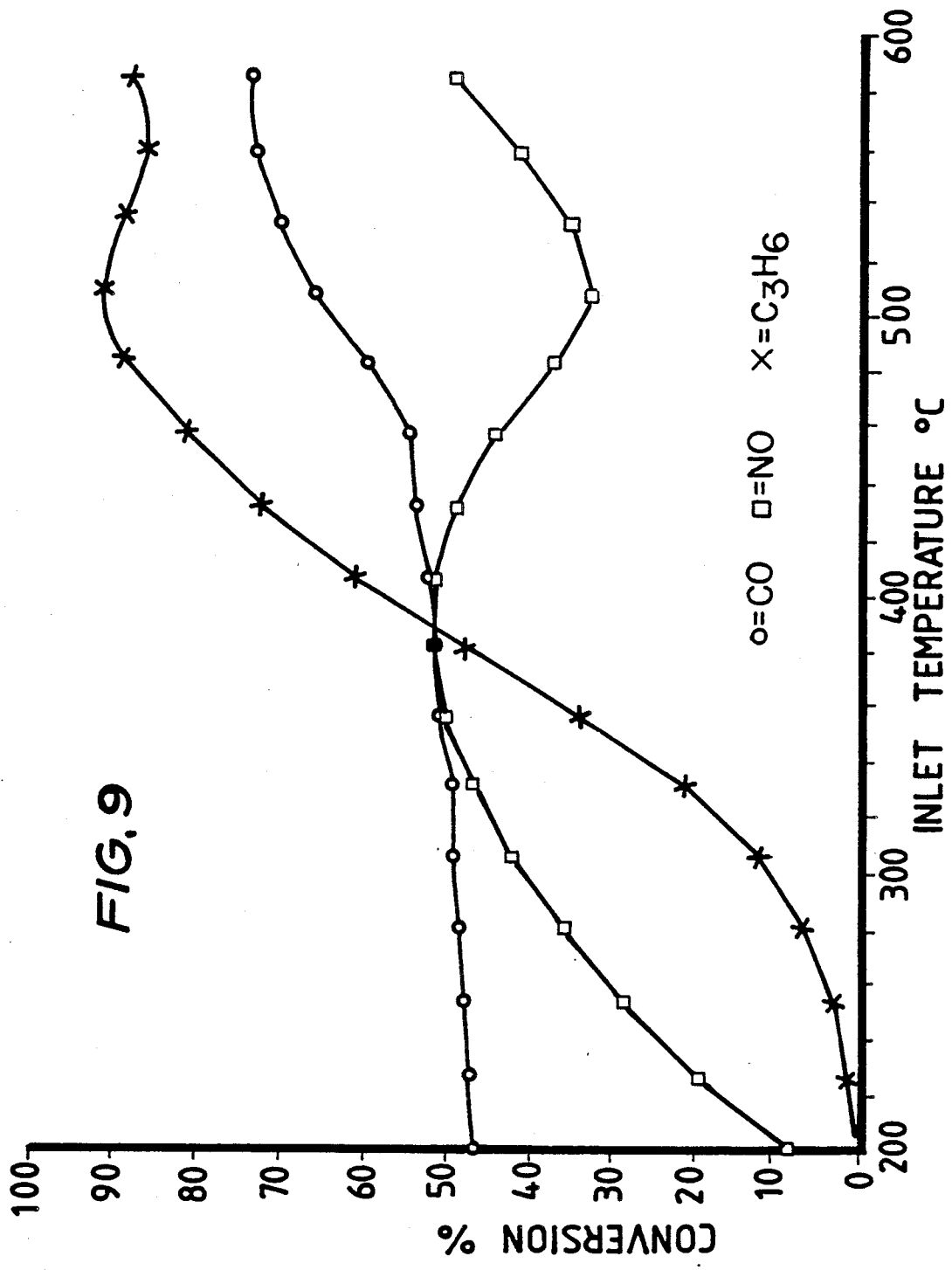

The catalyst (10 g) was tested in the apparatus described above using "rich" gas mixture. The results are shown in FIG. 8 and illustrate the drop in catalytic effectivity when the ceria is of low surface area.

EXAMPLE 5

367.9 g of aluminium (III) nitrate, 252.2 g of cerium (III) nitrate and 9.1 g of copper nitrate were dissolved in 1000 ml of distilled water with the aid of a high-shear mixer. Ammonium hydrogen carbonate (380 g) dissolved in 500 ml water was slowly added with stirring. Formation of a light blue gelatinous precipitate occurred, which gradually darkened on standing. The so-formed gel was dried and then calcined at 500° C. for 2 hours. The resultant green powder had a surface area of 109 $m^2 g^{-1}$.

The catalyst was "lean" hydrothermally aged by passing a mixture of 10% $H_2O$, 1% $O_2$, 89% $N_2$ at 1000° C. through it for 4 hours. The aged catalyst (6.5 g) was then tested in the apparatus described above using a "rich" gas mixture, the results being shown in FIG. 9. By way of comparison, a similarly aged mixture of preformed CuO, $CeO_2$ and $Al_2O_3$ was tested under similar conditions, the results being shown in FIG. 10. The intimate mixture of this invention is much superior as a catalyst.

EXAMPLE 6

As an alternative to impregnation of ceria as described in Example 3, the copper component may be introduced by ion-exchange.

50 g of ceria (prepared as described in Example 3) was slurried with 50 ml of distilled water. To this was added an ammoniacal solution of copper nitrate, resulting in a deep blue dispersion of hydrated ceria. After stirring for 1 hour, the aqueous phase of the dispersion was colourless. Excess water was removed and the green solid was dried and finally calcined at 500° C. for 2 hours.

10 g of this catalyst was tested under a "rich" exhaust gas mix and gave results comparable with those shown in FIG. 2.

EXAMPLES 7-11

A series of activity tests were conducted using a simulated car exhaust gas of "fuel rich" composition as described above, the ratio $$\frac{\text{actual air:fuel}}{\text{stoichiometric air:fuel}}$$

being 0.98. Five catalyst formulations were tested, each employing an alumina support, the weight of alumina being three times the weight of ceria employed in the catalyst. Catalyst formulations A, B, C and D were prepared by the method described in Example 2 but using such amounts of starting materials as to produce formulations wherein the proportion of copper oxide (measured as copper) to the combined weight of ceria and alumina is 1.5, 3.0, 6.0 and 24 weight percent respectively. Catalyst formulation E was prepared by impregnating gamma alumina with an aqueous solution of copper nitrate, drying at 110° C. for 16 hours, calcining at 500° C. for 2 hours, and mixing with ceria in water under high shear conditions to produce copper oxide supported on the alumina in intimate mixture with ceria. The amounts employed were such as to yield the catalyst formulation wherein the proportion of copper oxide (measured as copper) to the combined weight of ceria and alumina is 1.5 weight percent, i.e. the same as that of formulation A. The mixing employed for formulation E would be expected to produce a slightly less intimate mixture of copper oxide and ceria than that produced by impregnation of ceria (which could be in admixture with the support, e.g. alumina) with an aqueous solution of a copper compound and subsequent calcination to generate the copper oxide.

The formulations were hydrothermally aged as in Example 5 before their catalytic activity data were collected. The formulations were tested for their abilities to convert NO, CO and propene to harmless products ($N_2$, $CO_2$ and $H_2O$). The data are shown in the Table below, and include the conversion efficiency of each formulation at 580° C., and the temperatures at which 25% conversion of NO (the most difficult of the three to convert) and 50% conversion of CO and propene were achieved (measure of the ability to convert significant quantities of pollutants).

|   | Copper Content | Conversion Efficiency | | | | | | Surface Area $m^2 g^{-1}$ |
|---|---|---|---|---|---|---|---|---|
|   |   | NO | | CO | | $C_3H_6$ | | |
|   |   | 580° | T25 | 580° | T50 | 580° | T50 | |
| A | 1.5 | 47 | 335 | 66 | 481 | 96 | 425 | 56 |
| B | 3.0 | 45 | 301 | 70 | 377 | 92 | 400 | 39 |
| C | 6.0 | 50 | 279 | 73 | 373 | 91 | 393 | |
| D | 24  | 45 | 341 | 76 | 514 | 97 | 446 | 5 |
| E | 1.5 | 32 | 401 | 54 | 564 | 96 | 459 | |

580° = Percentage conversions at 580° C. (± 5%)
T25, T50 = temperature, °C., at which 25% of 50% conversion occurs (± 5° C.)

It can be seen that the formulations containing 1.5–6% copper relative to the combined weight of ceria and alumina have superior catalytic activity to that observed from the formulation containing 24% copper and prepared in the same way. This indicates that catalysts containing even more copper would be even more inferior, and hence that catalysts wherein the weight of copper oxide is less than the weight of ceria are superior.

It can also be seen, by comparing data for formulations A and E (which have equal copper loadings), that formulation A is markedly superior to formulation E, demonstrating the benefit of maximising the intimacy of the Cu-Ce interaction.

We claim:

1. A catalyst for use in a method of treating gaseous effluents in order to combat air pollution by contacting the gaseous effluents with the catalyst, in which the catalyst consists essentially of an intimate mixture of copper oxide and ceria, the weight of the copper oxide being less than the weight of the ceria.

2. The catalyst according to claim 1, wherein the gaseous effluents to be treated are the exhaust gases of internal combustion engines.

3. A catalyst for use in a method of combating the pollution of air by the exhaust emissions from internal combustion engines by contacting the emissions with the catalyst at elevated temperature, to convert nitric oxide, carbon monoxide and hydrocarbons in the emissions to nitrogen, carbon dioxide and water, in which the catalyst consists essentially of an intimate mixture of copper oxide and ceria, the weight of the copper oxide being less than the weight of the ceria.

4. The catalyst according to claim 2, wherein the surface area of the catalyst is at least $4m^2g^{-1}$.

5. The catalyst according to claim 2, wherein the surface area of the catalyst is at least $20m^2g^{-1}$.

6. The catalyst according to claim 2, wherein the proportion of copper oxide (measured as copper) to ceria is 0.1 to 10 weight percent.

7. The catalyst according to claim 2, wherein the catalyst also contains other rare earth metal oxide in a proportion (measured as metal) of up to 10 weight percent of the ceria (measured as cerium).

8. A catalyst for use with an internal combustion engine whose exhaust apparatus contains a catalyst to convert nitric oxide, carbon monoxide and hydrocarbons in the exhaust emissions of the engine to nitrogen, carbon dioxide and water, wherein the catalyst consists essentially of an intimate mixture of copper oxide and ceria, the weight of the copper oxide being less than the weight of the ceria.

9. The catalyst according to claim 8, wherein the catalyst has a surface area of at least $4m^2g^{-1}$.

10. The catalyst according to claim 8, wherein the catalyst has a surface area of at least $20m^2g^{-1}$.

11. The catalyst according to claim 8, wherein the proportion of copper oxide (measured as copper) to ceria is 0.1 to 10 weight percent.

12. The catalyst according to claim 8, wherein the catalyst also contains other rare earth metal oxide in a proportion (measured as metal) of up to 10 weight percent of the ceria (measured as cerium).

* * * * *